Dec. 14, 1965  R. L. BUCKERIDGE  3,222,813
METHOD OF AND MEANS FOR CONTROLLING CASTING OF A FISHING LINE
Filed Nov. 13, 1961  2 Sheets-Sheet 1
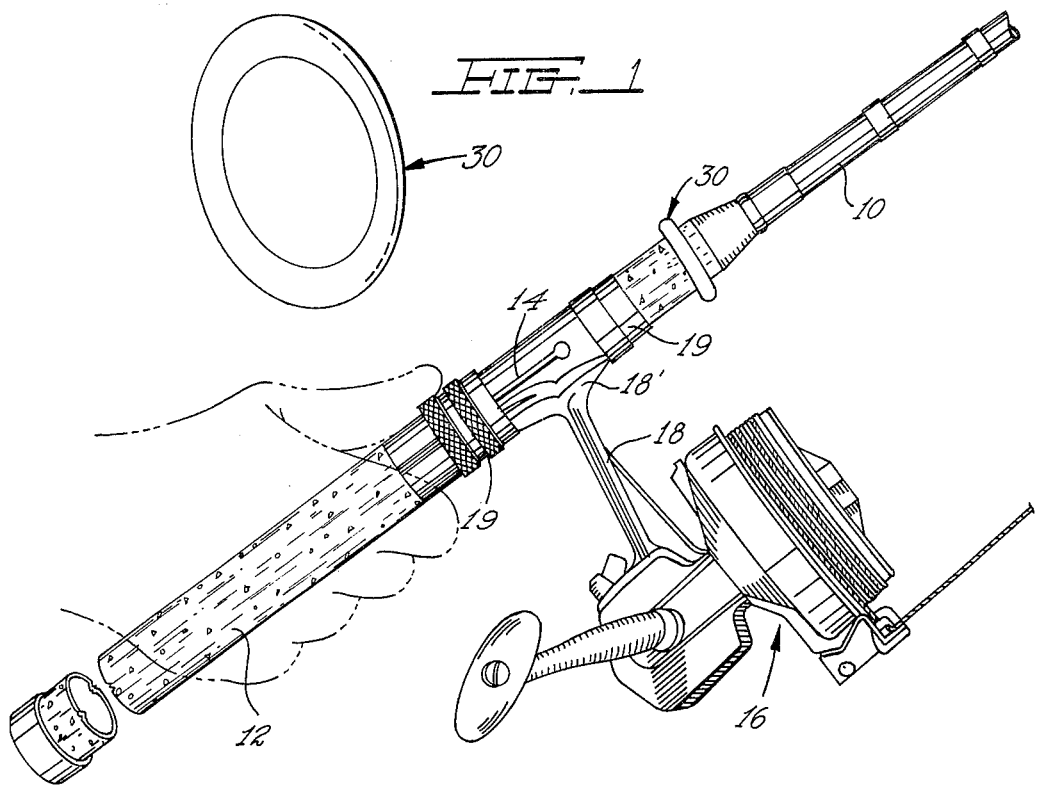
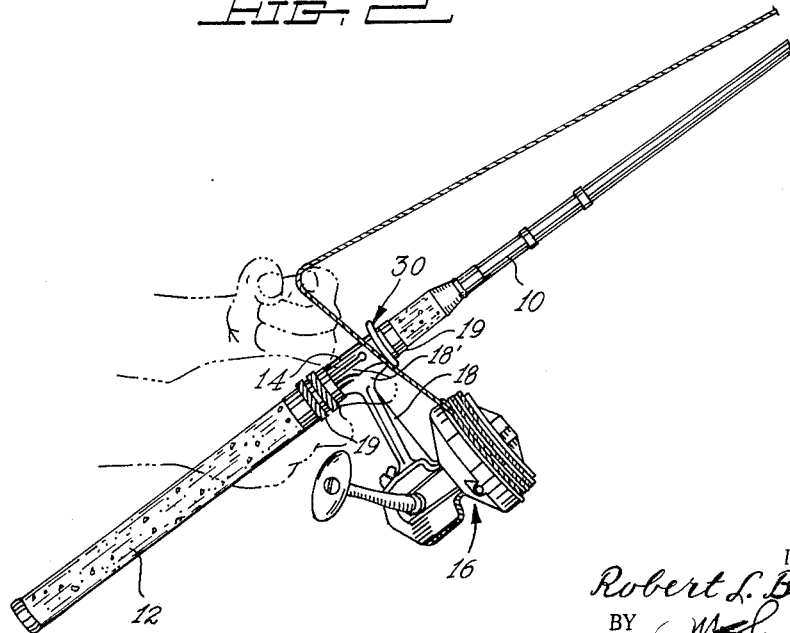
INVENTOR.
Robert L. Buckeridge
BY
Attorney Dec. 14, 1965   R. L. BUCKERIDGE   3,222,813
METHOD OF AND MEANS FOR CONTROLLING CASTING OF A FISHING LINE
Filed Nov. 13, 1961   2 Sheets-Sheet 2
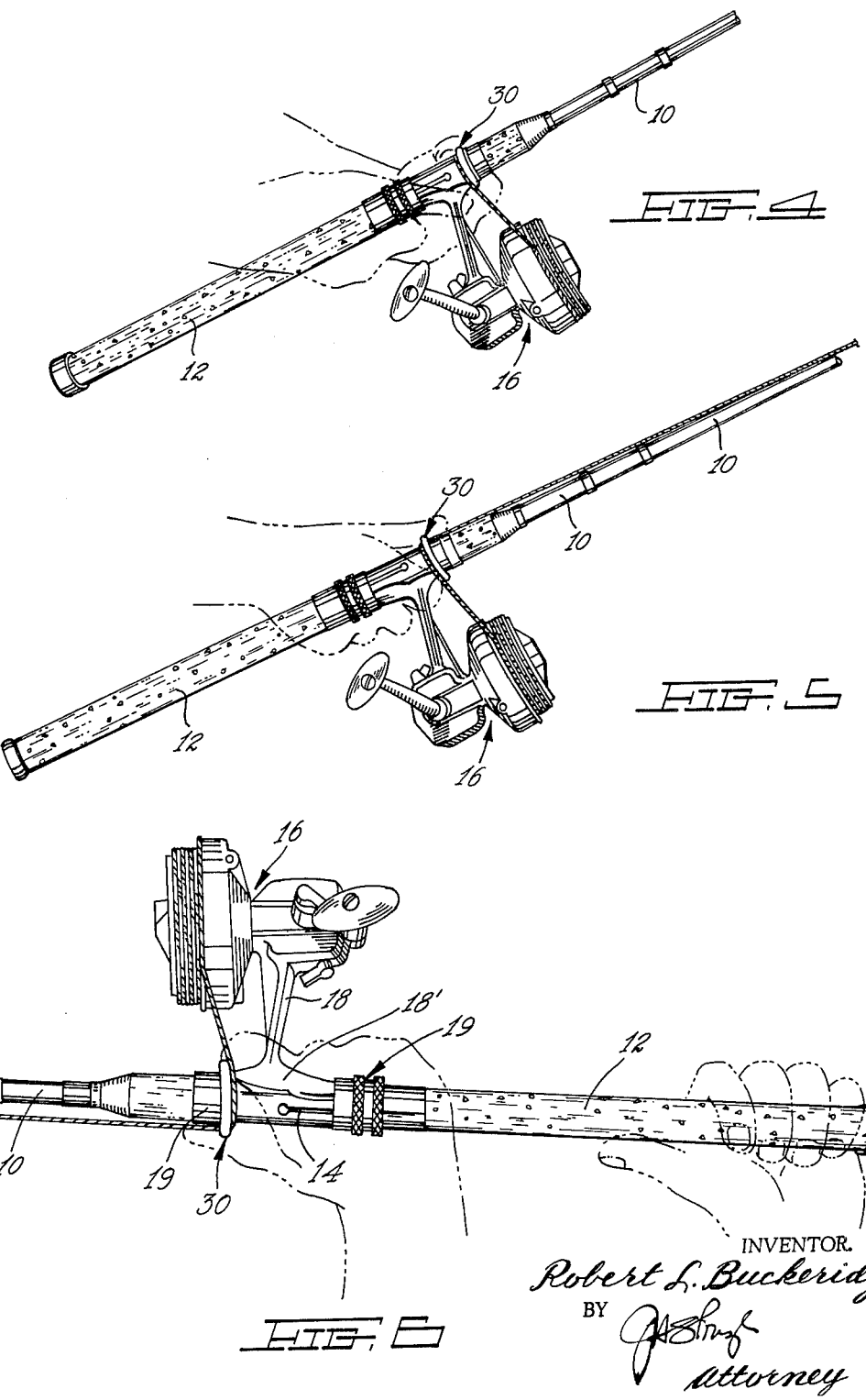
INVENTOR.
Robert L. Buckeridge
BY
attorney United States Patent Office 3,222,813
Patented Dec. 14, 1965

3,222,813
METHOD OF AND MEANS FOR CONTROLLING CASTING OF A FISHING LINE
Robert Lindsay Buckeridge, Hastings, New Zealand, assignor to True Temper Corporation, Cleveland, Ohio, a corporation of Ohio
Filed Nov. 13, 1961, Ser. No. 151,887
2 Claims. (Cl. 43—25)

This invention relates in general to a fishing rod and reel assembly, and more particularly to a new and improved means for controlling casting of a fishing line paid out from a reel carried by a fishing rod and whipping thereof.

It has heretofore been common practice, in the art of casting, to selectively control the cast of the fishing line manually, and in casting heavy lures, it has been common practice to control the cast and brake the line by applying the tip of the index finger to the line and holding the same against a portion of the rod, and the line was held until an appropriate time during the cast when the finger was removed and the line released. This arrangement not only involved placing a significant amount of pressure on the index finger, causing irritation thereof, but, also, prevented the caster from using his hand to the utmost advantage in order to attain the maximum length of cast.

In order to alleviate the above recited disadvantages attempts have been made in prior art devices to mechanically hold or brake the line during a portion of the casting cycle, thereby eliminating the use of finger pressure directly on the line. An example of such a device is illustrated and described in United States Letters Patent issued to W. C. Butehorn, Patent Number 2,843,963, issued July 22, 1958.

Although mechanical devices of this nature accomplished the intended result of freeing the hand pressure, and particularly that of the index finger, for maximum usage during the casting operation, all such devices within my knowledge are subject to the objection that they must be separately attached to the fishing rod or secured to the reel, a time-consuming task at best, and oftentimes required the use of special tools for their attachment, which are not often at the disposal of the fisherman.

It is therefore a primary object of my invention to provide a line-controlling or braking means for use with fishing rods wherein such braking means are easily placed on the fishing rod, being telescoped thereover, and the use of such braking means requires a minimum of force with maximum ease.

It is a further object of my invention to provide a line-controlling means readily movable longitudinally on the fishing rod for immediate use in braking the line during the casting operation, and which can be readily and quickly displaced during casting when such braking is not desired.

Yet another object of the invention is to provide a novel line-controlling means which is composed of but a single part, relatively inexpensive in manufacture, and yet highly durable in use under virtually any climatic condition, withstanding salt and other deleterious conditions.

These and other objects of my invention will become more readily apparent from the ensuring specification and accompanying drawings in which:

FIG. 1 is a perspective view of the novel line-controlling means of my invention;

FIG. 2 is a perspective view of a fishing rod and reel assembly having associated therewith the novel-line engaging, line-controlling means of my invention; the line-controlling means being inoperable in this showing;

FIGS. 3 through 6 are perspective views similar to FIG. 1, showing, step by step, the use of the line-controlling means of my invention during casting.

Referring now to the drawings and particularly to FIG. 2 thereof, at 10 I show a fishing rod of conventional nature having attached to the end thereof a handle means 12, the latter being illustrated as the well known cork type. Attached to the handle means 12 is an open face spinning reel 16, of the type adapted to be secured below and in bracket dependent position from the rod, the bracketing or attaching member comprising a T-shaped member having a stem or shank 18 and a crosshead or base 18' paralleling the handle and connected thereto by collars or equivalent attaching members 19. In normal fashion, one of said members 19 is fixedly mounted on a metallic sleeve 14 positioned over the fishing rod and the other of said members 19 is adjustably mounted on said sleeve 14 in order to readily attach or detach the spinning reel base 18' to or from the fishing rod.

The fishing rod and handle, the spinning reel assembly, and the manner in which the spinning reel is attached to the fishing rod forms no essential part of the instant invention and further specific reference thereto is deemed nonessential to a full understanding of the present invention.

Telescope over a portion of the handle 12 and preferably forwardly of the reel seat thereon, is the novel line-controlling member of my invention, illustrated generally at 30. Referring now to FIG. 2, the line-controlling member 30 comprises a resilient O ring made from, e.g. rubber, neoprene, or other suitable resilient or plastic material. The inner diameter of the O ring 30 is slightly less than the exterior diameter of the fishing rod portion over which the same is adapted to be telescope, whereby the O ring 30 may be frictionally held in place on the handle 12 when telescoped thereover but longitudinally slidably moved thereon. By making the inner diameter of O ring 30 of slightly less dimension than the outside diameter of handle 12, the O ring 30 will be frictionally held in position in the absence of any external force applied thereof. However, when manual pressure is applied by the caster the O ring can be caused to reciprocate longitudinally or be deformed on the shaft 12, as will be hereinafter described.

As previously described, the use of heavy lures requires that pressure be applied to the line during a portion of the casting cycle to thereby prevent undesired flight of the fishing line.

The manner in which the O ring 30 functions to control the fishing line during the casting operation will now be described, with particular reference to FIGS. 3 through 6.

Referring now initially to FIG. 3, at the initiation of the casting operation, the right hand normally clamps the fishing rod handle 12 with the fingers bent about the same and adjacent the base portion of the spinning reel and the thumb lies over the rod whereby a firm grip is attained on the fishing rod and reel assembly. The left hand of the caster, and preferably the left index finger, as illustrated in FIG. 3, then is used to lift the fishing line and move the same rearwardly to a position immediately behind the O ring 30. It will be noted that prior to the lifting and placement of the line in this manner, the O ring is preferably moved rearwardly on the fishing rod to a position telescoping the sleeve member 14 or the forward smooth collar 19 thereon. The exact location of the O ring in relation thereto is not particularly significant, as long as the O ring is moved rearwardly of the rod a sufficient distance to enable the caster to span the intervening distance between his grip on the rod and the ring to be able to engage the ring with the thumb of his right hand during the casting operation. It will thus be apparent that the optional positioning of the O ring prior to use for braking depends upon the size of the hand of the caster.

Referring now to FIG. 4, the fishing line is drawn by the left hand downwardly and around the periphery of the O ring, as clearly shown in FIG. 4. As the fishing line is drawn by the left hand around the periphery of the said O ring, the right hand is permited to remain in engagement with the fishing rod and base of the spinning reel, as shown in FIG. 2.

Subsequent to the manipulation of the fishing line into the FIG. 4 peripherally engaging position with the O ring, the thumb of the right hand of the fisherman is caused to move into engagement with the O ring, as shown in FIG. 5, and pressingly engages the same and the left hand may then be released. As the thumb of the right hand is moved rearwardly over the upper edge of the O ring 30 or to the left (as shown in FIG. 5), the resilient nature of the O ring 30 enables the walls of the O ring to be distorted by the thumb pressure, whereupon the rearwardly facing annular wall of said O ring is caused to seat over or clamp the fishing line in between the ring and the rod due to the pressure applied to the ring by the thumb. When pressure is applied by the right thumb in this manner it will be apparent that the fishing line will be damped or braked by the O ring and further outward movement of the fishing line is prevented.

When the holding or the braking of the fishing line is achieved in the above described manner, the cast can be successfully initiated by swinging the rod first upwardly and rearwardly over the shoulder.

Referring now to FIG. 6, the caster preferably grips the handle 12 with his left hand underlying the same while the thumb of his right hand remains in the position above the handle 12 as illustrated in FIG. 5. The fishing rod can then be retracted in an arc over the shoulder and behind the caster and, at the initiation of the cast, the fishing line is prevented from paying out due to the impinging of the O ring on the fishing line. As the caster moves the rod in a forward arc immediately after the initial upper and rearward casting movement, pressure is maintained on the line by continued application of the thumb to the O ring, as shown in FIG. 6, but as the caster continues to move the fishing rod forwardly, the line is released by using the thumb to advance the O ring forwardly of the line and to permit the line to pay out, in order to effect a maximumly efficient cast.

In practicing the invention, it has been found that relatively heavy lures, as well as relatively light lures, can be easily controlled through usage of the novel O ring.

It will thus be seen that I have accomplished the objects of my invention. I have provided a fishing line controlling or braking means that is highly simplified, inexpensive to manufacture, and extremely efficient in usage. The O ring is easily positioned around the fishing rod, may be used with rods and reels of different types, and does not require the use of any tools therefor. The resilient O ring is durable, is not adversely affected by climatic conditions, and is easily removable.

What I claim as my invention is:

1. A fishing rod and reel assembly comprises a fishing rod and handle therefor, a spinning reel carried by the handle, a fishing line carried by said reel and rod, said line being maintained along the length of said fishing rod, a fishing line controlling means comprising a resiliently deformable O-ring telescopically positioned around said fishing rod handle adjacent the reel mounting, said O-ring being manually slidable rearwardly on said rod handle during a casting operation to overlap a portion of the fishing line drawn manually upwardly of the reel and rearwardly of the O-ring prior to said movement; the line being clamped thereby between the O-ring and an underlying surface of said rod handle by means of manual pressure exerted on said O-ring during casting.

2. A fishing rod and reel assembly as in claim 1 characterized by manually slidable forward movement of the O-ring releasing said pressure on the line permitting pay-out thereof.

References Cited by the Examiner

UNITED STATES PATENTS

| | | | |
|---|---|---|---|
| 965,989 | 8/1910 | Coller | 43—23 |
| 2,018,923 | 10/1935 | Potter | 43—23 |
| 2,144,122 | 1/1939 | Pflueger | 43—25 |
| 2,804,711 | 9/1957 | Kozar | 43—25 |
| 2,815,604 | 12/1957 | Fiscus | 43—44.95 |
| 3,067,537 | 12/1962 | Gregory et al. | 43—25.2 |

FOREIGN PATENTS

| | | |
|---|---|---|
| 586,353 | 1/1925 | France. |
| 856,934 | 4/1940 | France. |

ABRAHAM G. STONE, *Primary Examiner.*